UNITED STATES PATENT OFFICE.

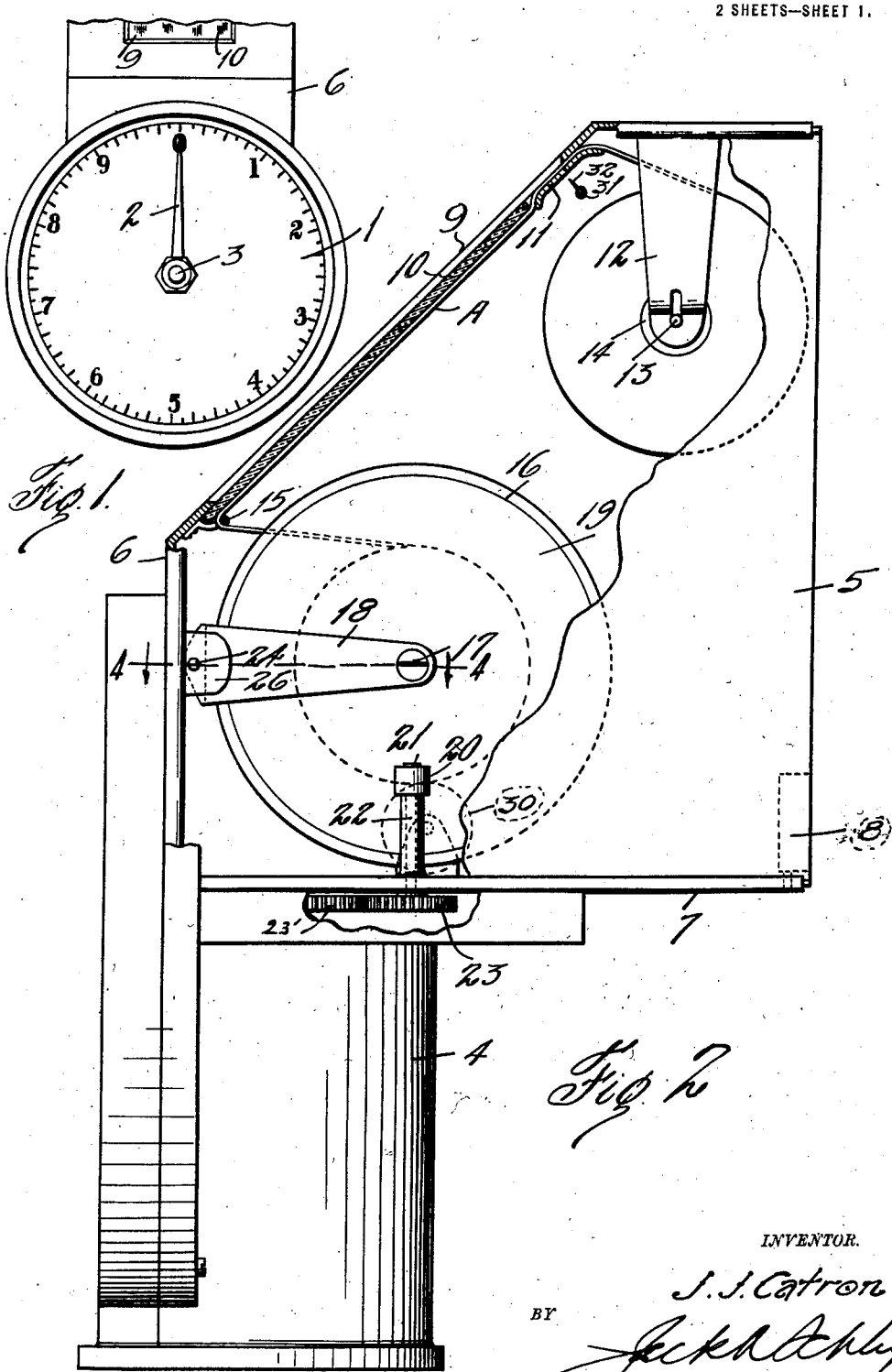

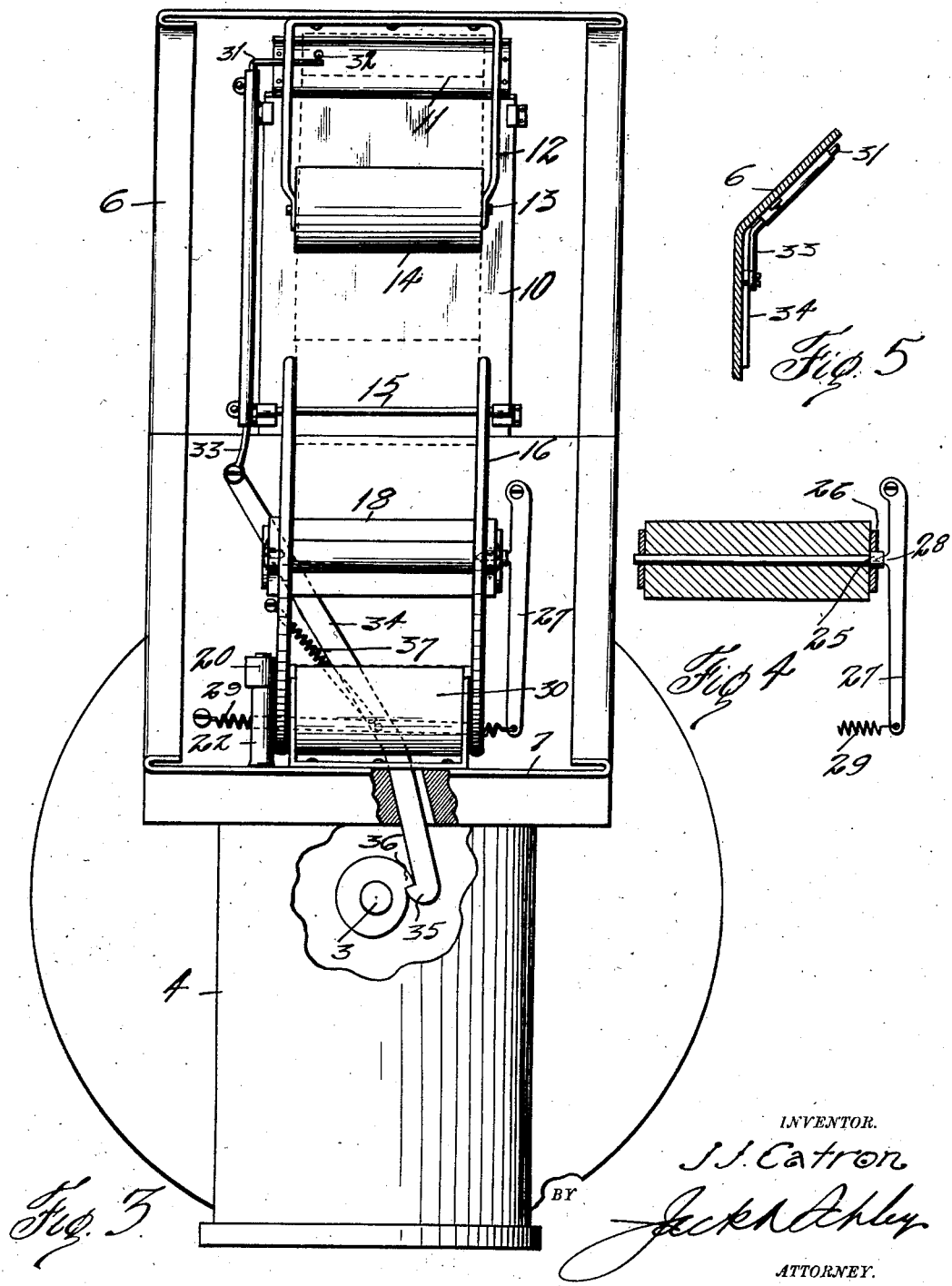

JOHN J. CATRON, OF BONHAM, TEXAS.

RECORDING APPARATUS.

1,329,886.  Specification of Letters Patent.  Patented Feb. 3, 1920.

Application filed May 7, 1918. Serial No. 233,082.

*To all whom it may concern:*

Be it known that I, JOHN J. CATRON, a citizen of the United States, residing at Bonham, in the county of Fannin and State of Texas, have invented certain new and useful Improvements in Recording Apparatus, of which the following is a specification.

This invention relates to new and useful improvements in recording apparatuses.

The idea involved in this invention is to provide a traveling medium on which records may be written and to associate the medium with a measuring device so that said medium is traversed as the measuring device is operated whereby the readings of the measuring device may be written on the medium in a correlated manner. And further to associate a mutilating device which acts on the medium whenever the measuring device is reset thus indicating that the device has been used.

In carrying out the invention I employ a strip of paper or other medium which is wound from one spool to another and is passed over a writing support and under a glass so that the preceding writing may be observed. I also provide a driving means for the winding spool which is novel in that it is arranged to traverse the paper equally for given measurements irrespective of the diameter of the winding roll. This is particularly desirable in connection with a punching device which is correlated with the measuring apparatus so as to punch a hole in the paper each time the indicator of the measuring device is returned to zero. By giving the strip of paper a uniform travel for each graduation of the measuring device the successive readings of the measuring device can be checked by the frequency and distance between the holes punched in the paper. For punching the paper various means could be used and I have obtained very good results by the use of a rock shaft with a spur which penetrates the paper when the shaft is rocked.

The invention will be more readily understood from a reading of the following specification and by reference to the accompanying drawings, in which an example of the invention is illustrated, and wherein—

Figure 1 is a front elevation of an apparatus constructed in accordance with this invention, Fig. 2 is a transverse vertical sectional view of the same, Fig. 3 is a rear elevation.

Fig. 4 is a horizontal cross sectional view on the line 4—4 of Fig. 2, and

Fig. 5 is a detail of the clipping device for the paper punching means.

In the drawings the numeral 1 designates the dial of an ordinary liquid measuring device and 2 the hand or pointer thereof which is mounted on a shaft 3 extending into a housing 4 in which the usual operating means is contained. On the housing 4 I mount a casing 5 adapted to be inserted from the rear against a front support 6 and resting on a horizontal platform 7. This casing may be provided with a lock 8 whereby it can be fastened in position. The support 6 has an inclined face provided with a slot 9, the underside of which is covered by a glass or other transparent material 10 which terminates short of the upper end of the slot under which a transverse writing table 11 is mounted. From the top of the support 6 a pair of hangers 12 depend and receive the trunnions 13 of a roller 14 on which a strip of paper or other medium A is wound.

The strip A being wound on the roller 14 constitutes a spool and the paper is led from the spool over the table 11 so as to be exposed in the slot and passed down under the glass. The slot exposes a narrow transverse panel of the paper on which writings may be recorded, the part 11 acting as a support. The strip A is passed under a guide 15 at the lower end of the glass and carried to a spool 16 which is mounted on removable pins 17 in a yoke 18. The spool 16 has an outer face 19 of one of its flanges covered with rubber or other frictional material which engages with a friction pinion 20 mounted on a vertical shaft 21 supported in an upright sleeve 22 fastened on the platform 7. The shaft 21 projects into the housing 4 and carries a gear 23 which meshes with the meter gearing 23' within the housing.

The gear 23 and pinion 20 are proportioned so as to give a revolution of the spool in ratio to the movement of the hand 2 for each unit of measurement, whereby the strip A will be moved an equal distance for each unit of measurement covered by the hand. However, it is obvious that unless some provision was made the increasing diameter of the roll of paper wound on the spool 16 would alter the travel of said paper. To overcome this the yoke 18 is pivoted on a shaft 24 which has a shouldered enlargement 25 at one end bearing against the yoke. The parts 24 and 25 are mounted in ears 26 projecting from the support and a tension lever 27 pivoted on the rear side of the support has a lug 28 in engagement with the part 25; while a coiled spring 29 extending from the lower end of the lever holds the lug in engagement with the part 25 whereby sufficient friction is exerted on the spool to alleviate the play. Between the flanges of the spool a supporting roller 30 is mounted on the platform 7 so that the roll of paper rests directly thereon. The line of contact between the roller 30 and the roll of paper registers with the horizontal plane of the points of contact between the pinion 20 and the face 19. By this arrangement as the diameter of the roll on the spool 16 increases the spool is displaced upward so that the relative point of engagement between the pinion 20 and the face 19 is moved outward from the center and the gear ratio increased in proportion to the increase in the diameter of the roll of paper, whereby the strip of paper is caused to travel uniformly irrespective of the diameter of the winding roll.

In using the measuring device the hand 2 is always set at the zero mark. When the meter is operated the mechanism associated with the shaft 3 rotates the latter and causes the hand to travel clockwise and to successively pass over the units of measurement on the dial. During this operation the gear 23 is being rotated whereby the spool 16 is revolved and the strip A traversed. At this point the operator writes on the strip A, which is exposed over the table 11, the reading of the meter and any other designation such as the name of the customer or the character of the sale if desired. I also provide for mutilating the paper strip at this point which affords a check on the record for the reason that the paper must travel the same distance for each unit of measurement and by measuring the distance between each successive mutilations or punched holes the exact quantity dispensed may be accurately determined. I arrange this mechanism to be operated when the hand 2 is returned to zero after each sale or operation of the meter.

For carrying out this operation I mount on the underside of the inclined portion of the support 6 a rock shaft 31 having an offset spur or point 32 arranged to swing through an aperture in the table 11 and punch a hole in the strip A. The rock shaft has a crank arm 33 at its lower end which is pivoted to the upper end of a link 34 disposed at an angle between the parts 26 and passing down through the platform 7. The link 34 has a hook 35 on its lower end in the path of an eccentric lug 36 on the shaft 3. A coiled spring 37 attached to the link and one of the ears 26 holds the link upward and the rock shaft in its normal position whereby the spur 32 is inactive below the table. When the hand 2 is swung counter clockwise to return it to zero the shaft 3 is revolved so that the lug 36 engages the hook 35 and pulls the link 34 downward. This swings the crank 33 and rocks the shaft 31 whereby the spur 32 is swung through the aperture of the table and the paper punched. Just as soon as the meter is again started the shaft 3 is rotated in the opposite direction whereby the lug 36 is carried out of the path of the hook 35 and the spring 37 given an opportunity to return the parts to their normal position and swing the spur out of the paper.

What I claim is,

1. In a recording apparatus, the combination with a measuring device having an indicator which is arranged to be reset for each measuring operation, of a support, a writing table mounted on the support, a strip of paper carried by the support and passing over the writing table, a spool mounted to swing on the support and on which the strip of paper is wound in a roll, a shaft carried by the support and driven by the measuring device, a friction pinion on the shaft engaging the spool, a roller mounted on the support and engaging the roll formed by the paper wound on the spool for supporting said spool, a punching device mounted on the support and having an element for penetrating the paper, and a device for operating said punching element in position to be operated by the indicator of the measuring device when said indicator is reset.

2. In a recording device, the combination with a writing table adapted for supporting a writing strip traveling in contact therewith, a substantially vertically swinging support arranged near the table, a spool carried by the free end of the support and adapted to have the writing strip wound thereon for providing a roll increasing in diameter during the operation of the device, a support held stationary beneath the spool, a supporting roll carried by the stationary support and engaging the strip roll of the spool to shift the spool upwardly, a substantially vertical rotatable shaft disposed near one end of the spool and held against vertical displacement, a friction gear rigidly secured to the substantially vertical shaft and contacting with the end of the spool, and means to rotate the substantially vertical shaft.

3. In a recording device, the combination with a spool for holding a writing strip, of a swinging support, a second spool carried by the free end portion of the swinging support and adapted to have the writing strip wound thereon for providing a roll increasing in diameter during the operation of the device, a support arranged at substantially a right angle to the plane of movement of the swinging support and held stationary, a supporting roll carried by the stationary support and engaging the writing strip roll of the second spool, a shaft arranged near one end of the spool and disposed in a plane substantially parallel with the plane of movement of the swinging support and held against longitudinal displacement, a friction gear rigidly secured to the said shaft and engaging the end of the spool, and means to rotate said shaft.

In testimony whereof I affix my signature.

JOHN J. CATRON.